US012012707B2

(12) United States Patent
McCarthy

(10) Patent No.: US 12,012,707 B2
(45) Date of Patent: Jun. 18, 2024

(54) OFFSHORE PLATFORM DECK REMOVAL METHOD

(71) Applicant: SAIPEM S.P.A., San Donato Milanese (IT)

(72) Inventor: Vincent George McCarthy, San Donato Milanese (IT)

(73) Assignee: Saipem S.P.A, San Donato Milanese (IT)

( * ) Notice: Subject to any disclaimer, the term of this patent is extended or adjusted under 35 U.S.C. 154(b) by 730 days.

(21) Appl. No.: 17/045,111

(22) PCT Filed: Apr. 2, 2019

(86) PCT No.: PCT/IB2019/052684
§ 371 (c)(1),
(2) Date: Oct. 2, 2020

(87) PCT Pub. No.: WO2019/193491
PCT Pub. Date: Oct. 10, 2019

(65) Prior Publication Data

US 2021/0148075 A1 May 20, 2021

(30) Foreign Application Priority Data

Apr. 4, 2018 (IT) ........................ 102018000004201

(51) Int. Cl.
*E02B 17/00* (2006.01)
*B63B 27/10* (2006.01)
(Continued)

(52) U.S. Cl.
CPC .............. *E02B 17/00* (2013.01); *B63B 27/10* (2013.01); *B63B 85/00* (2020.01); *B66C 23/52* (2013.01); *E02B 2017/0052* (2013.01)

(58) Field of Classification Search
CPC ......... B63B 27/10; B63B 85/00; B66C 23/52; E02B 2017/0052
See application file for complete search history.

(56) References Cited

U.S. PATENT DOCUMENTS 4,678,372 A * 7/1987 Cousty ................ E02B 17/0809 405/196
5,829,919 A 11/1998 Heerema

FOREIGN PATENT DOCUMENTS

WO 03076737 A1 9/2003
WO 2016048156 A1 3/2016

OTHER PUBLICATIONS

International Search Report and Written Opinion for International Patent Application No. PCT/IB2019/052684, dated Jun. 26, 2019, 8 pages.

* cited by examiner

*Primary Examiner* — Rick K Chang
(74) *Attorney, Agent, or Firm* — Armstrong Teasdale LLP

(57) ABSTRACT

A method for lifting a payload of an offshore platform is provided. The offshore platform comprises a support structure supporting the payload. The payload includes a main deck and a column directly connected to the support structure, the column supporting the main deck. The method includes coupling a plurality of tension rods to a lower lifting device, having a welding surface weldable to a welding portion of the column and an upper lifting device having a coupling interface such that the plurality of tension rods connect the lower lifting device and the upper lifting device. The plurality of extendable tension rods can extend along a rod direction between the lower lifting device and the upper lifting device to separate the payload from the support structure. At least some of the tension rods of the
(Continued)

plurality of tension rods are pre-tensioned to exert a compressive action to the payload.

10 Claims, 8 Drawing Sheets

(51) Int. Cl.
*B63B 85/00* (2020.01)
*B66C 23/52* (2006.01)

OFFSHORE PLATFORM DECK REMOVAL METHOD

CROSS-REFERENCE TO RELATED APPLICATIONS

This application is a National Phase Application of PCT International Application No. PCT/IB2019/052684, having an International Filing Date of Apr. 2, 2019 which claims priority to Italian Application No. 102018000004201 filed Apr. 4, 2018, each of which is hereby incorporated by reference in its entirety.

FIELD OF THE INVENTION

It is an object of the present invention a method and an assembly for offshore heavy module removal.

In particular, the present invention relates to a method and an assembly for lifting a payload from an offshore platform.

BACKGROUND OF THE INVENTION

Offshore structures, such as platforms for hydrocarbon extraction from the seabed and the like, generally comprise an above water topside including the payloads and a load transfer jacket that can be connected to the seabed through foundations or that can float (i.e. caissons) at a predetermined depth beneath the water. Regardless of the type of support structure, the topside usually comprises multi-level decks and columns to transfer the weight to the support structure.

Usually, a typical heavy module installation strategy prescribes the use of a semi-submersible vessel equipped with tandem cranes for the purpose of lifting the heavy module. Each of the cranes typically projects in a cantilevered manner to exploit the marine lever effect and have at least one hook attached at its end and designed to handle the offshore platform topside. When the vessel approaches the offshore jacket, which has been previously positioned in a predefined offshore site, the tandem cranes supporting cantilevered the topside structure hung thereto, lower down the topside module onto the jacket by means of ballasting the vessel.

The reverse operation, namely the topside heavy module removal, could be done by splitting the module and remove the single module parts by multiple lifting of each smaller portion of the heavy modules.

For example, document U.S. Pat. No. 5,829,919 shows a system for topside removal based on a marine lever method for lifting heavy modules. Specifically, engaging members projecting from a side of the vessel slide under the deck of the platform for the purpose of lifting the topside, and the lifting action is then carried out by disembarking water from the opposite side of the vessel. Lifting actions of this type can be carried out by means of standard-shaped barges or T-shaped barges that typically lift the heavy module by being received under the topside to be removed, or alternatively U-shaped barges that instead lift the heavy module substantially embracing it.

However, most of the time the original lifting points of the modules have been removed after installation or could be obsolete so new lifting points need to be made on the modules to be removed. Furthermore, an accurate evaluation of the actual weight and of the position of the center of gravity of the topside module to be removed is often non-possible because the module has been modified during years of intensive use offshore.

Challenges remain in securing lifting points on older structures and capitalize the existing load path of the modules to transfer loads from the fixed structure to the crane vessel. Moreover, many external forces may affect the load to be lifted and the stability of lifting operations, such as adverse weather and sea conditions as well as accelerations of the suspended topside module due to the lifting process.

It is strongly felt the need to provide a method and a system for heavy topside module removal allowing safe removal by lifting of the heavy topside module already installed offshore.

SUMMARY OF THE INVENTION

It is a scope of the present invention to overcome the drawbacks mentioned with reference to the prior art.

These and other scopes are achieved by an assembly for lifting a payload of an offshore platform, a crane vessel system and a method for lifting a payload of an offshore platform as described and claimed herein.

Some preferred embodiments are also described.

Thanks to the proposed solutions, it is possible to achieve faster lifting operations in respect of known art, without reducing safety of operation.

Thanks to the proposed solutions, it is allowed to lift a topside of a pre-installed offshore platform avoiding to overstressing the existing upright structures of the topside, such as the columns of the topside.

BRIEF DESCRIPTION OF THE DRAWINGS

Further characteristics and advantages of the invention will appear from the description reported below of preferred embodiments, which are given as examples and are not meant to be limiting, which makes reference to the attached figures, wherein.

DETAILED DESCRIPTION OF SOME PREFERRED EMBODIMENTS

Figure 1:
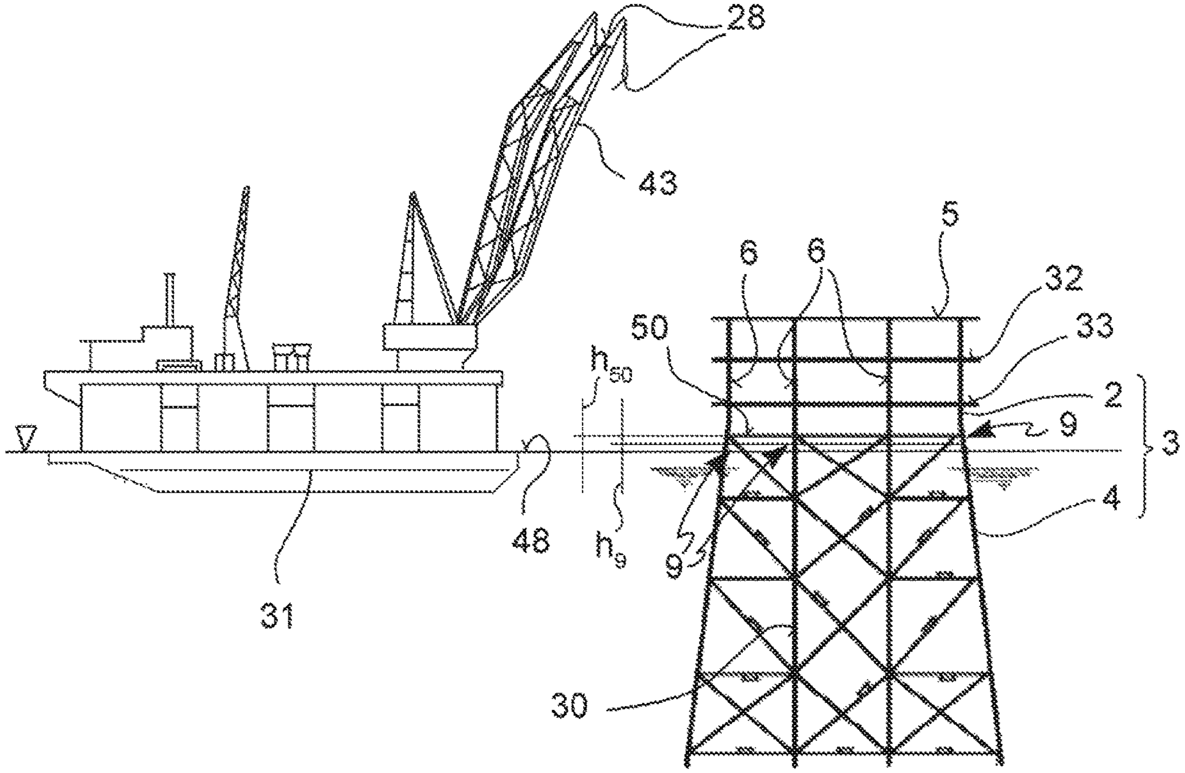
FIG. 1 is an elevation view showing a crane vessel and an offshore platform comprising a payload, according to an embodiment.
Figure 2:
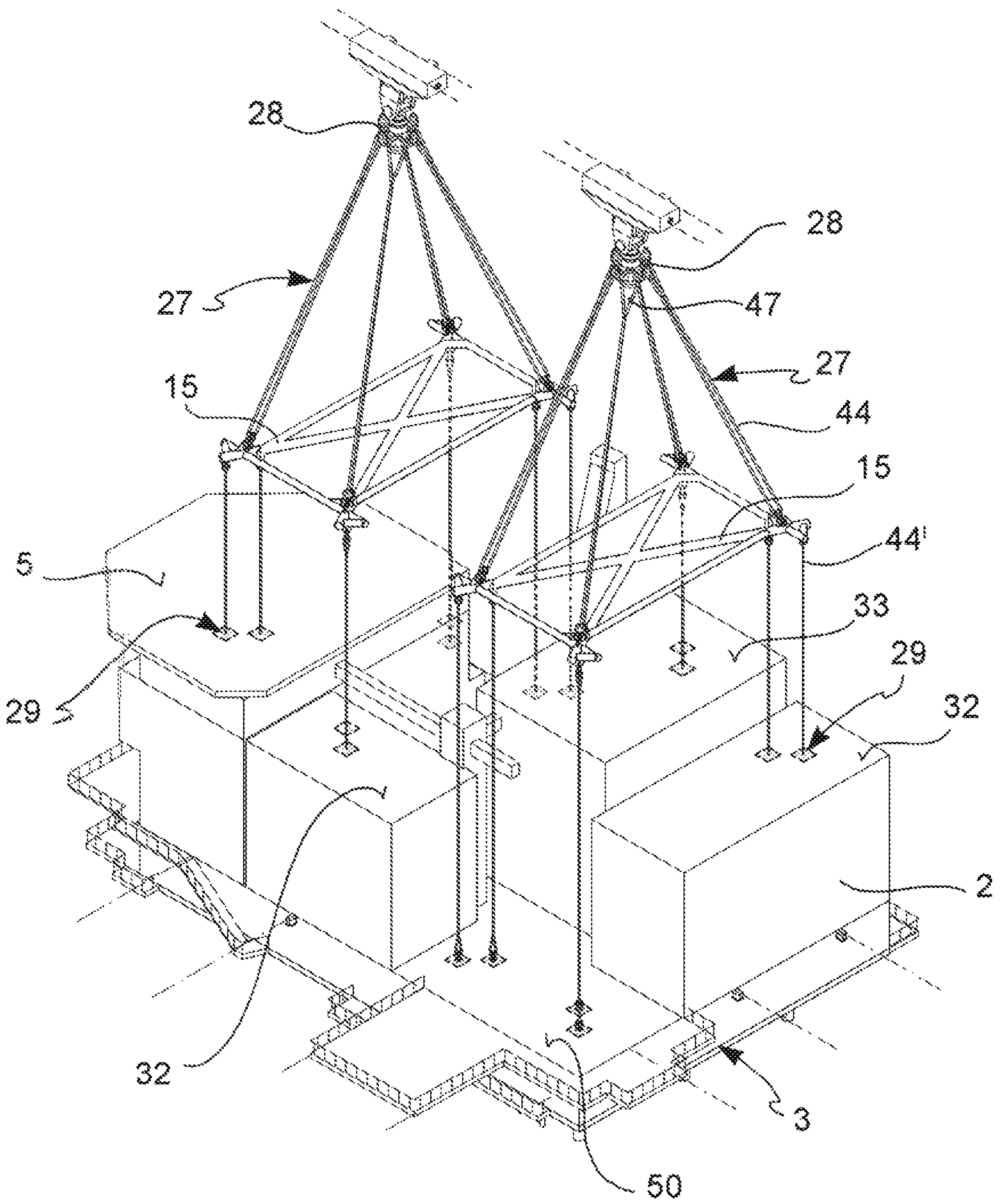
FIGS. 2 and 3 are perspective views showing an assembly, according to some embodiments, and an offshore platform wherein some parts of the columns of the payload of the offshore platform are not shown for sought of clarity.
Figure 3:
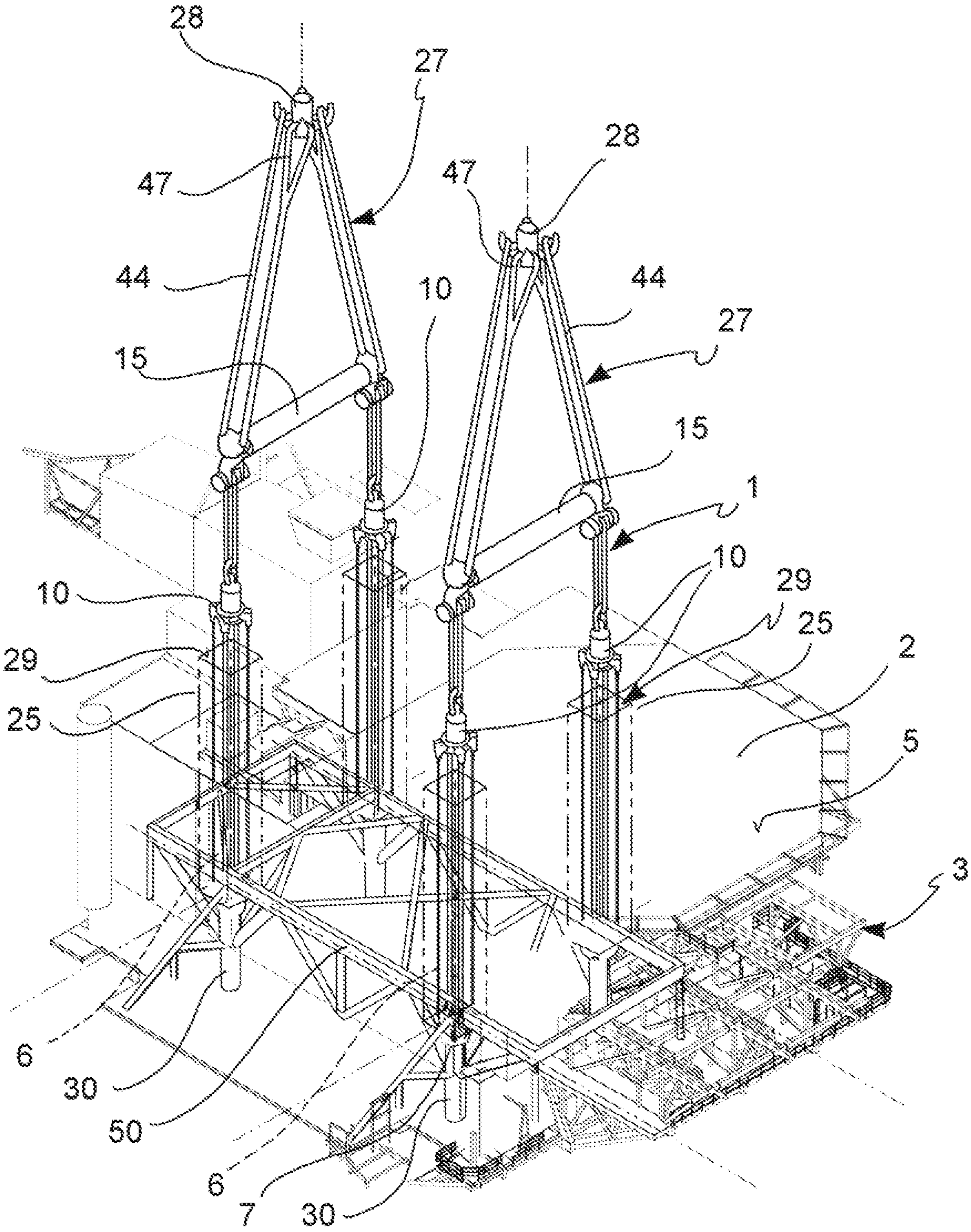
Figure 4:
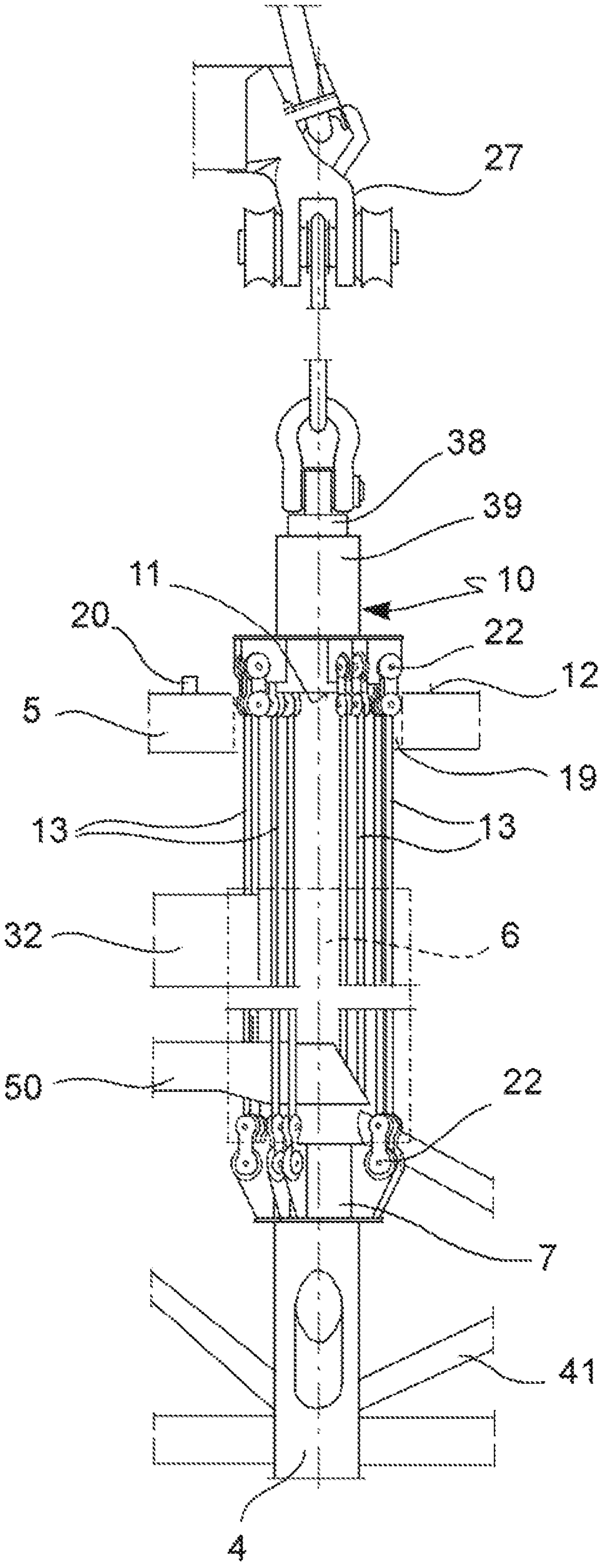
FIG. 4 is an elevation view of an assembly, according to an embodiment, during operative conditions.
Figure 7:
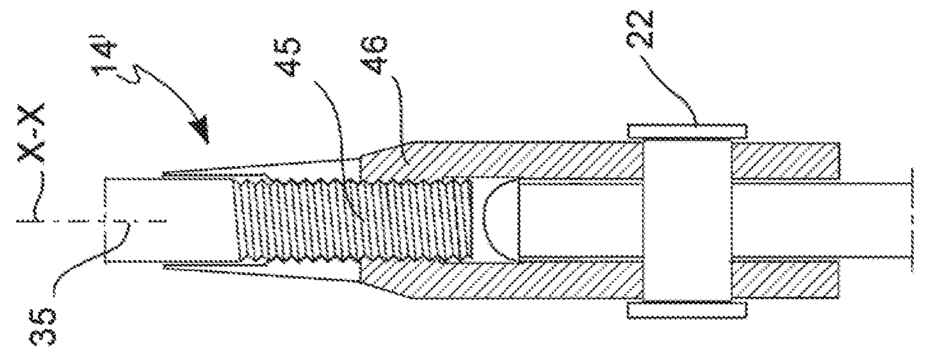
FIGS. 6 and 7 are cross sections of a joining device, according to some embodiments.
Figure 6:
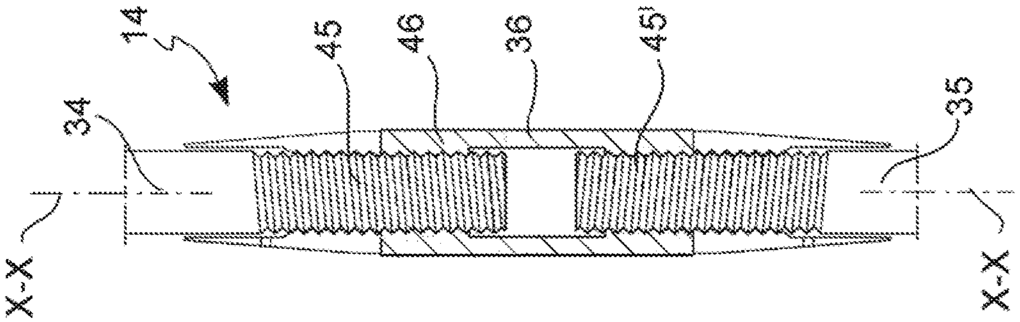
Figure 5:
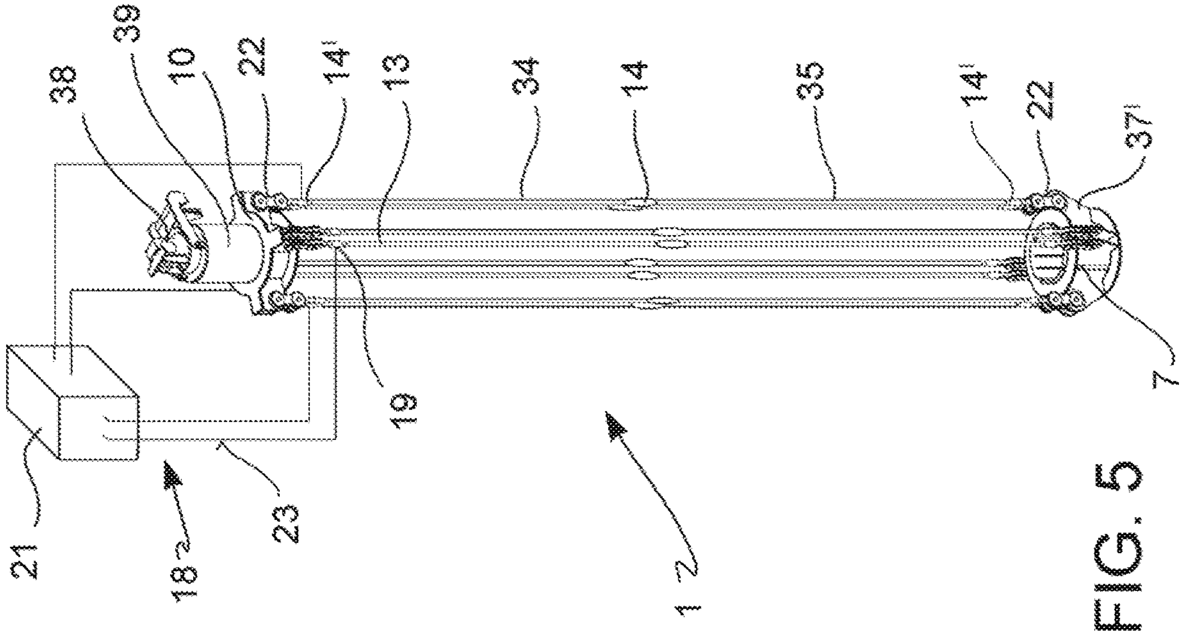
FIG. 5 is a schematized perspective view of an assembly, according to an embodiment.
Figure 8:
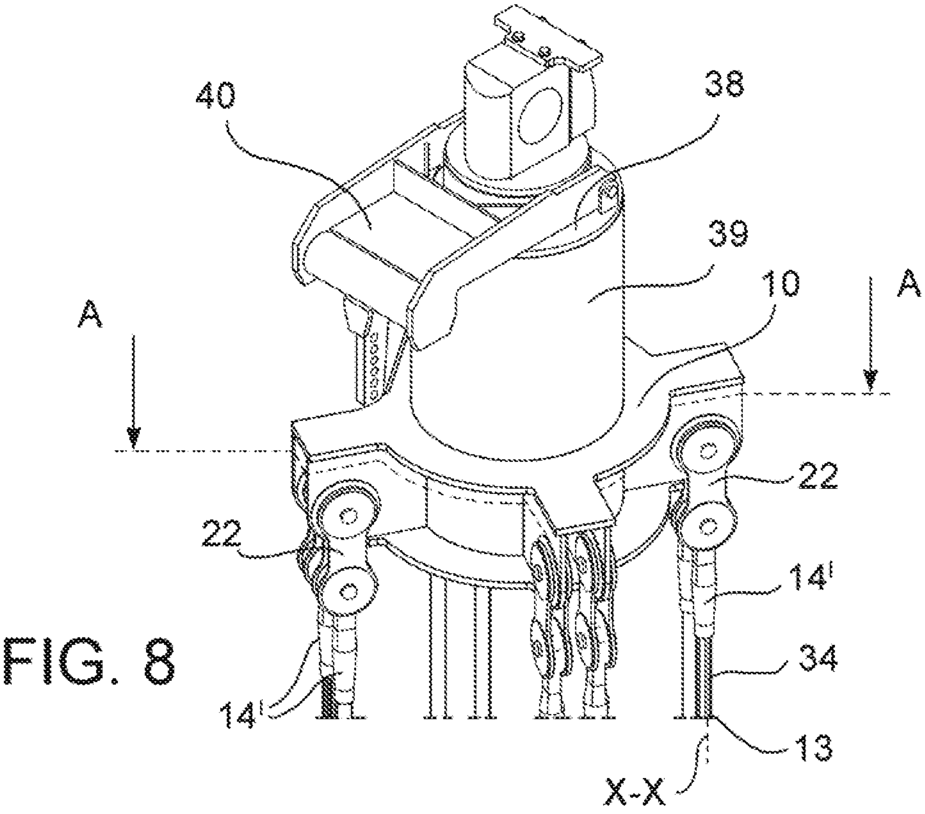
FIGS. 8 and 9 are perspective views of an upper lifting device, according to some embodiments.
Figure 9:
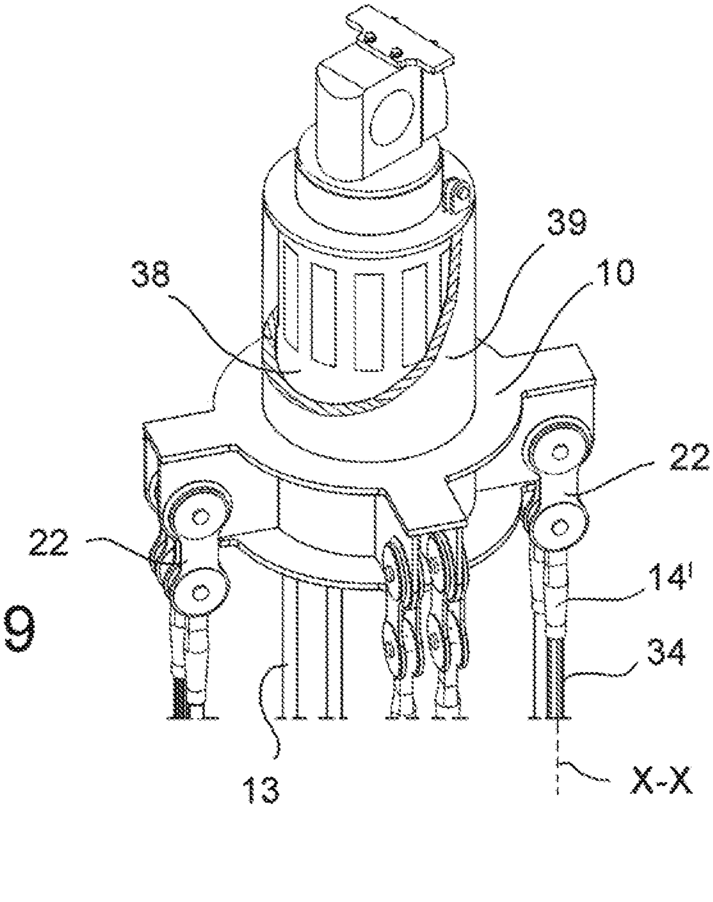
Figure 10:
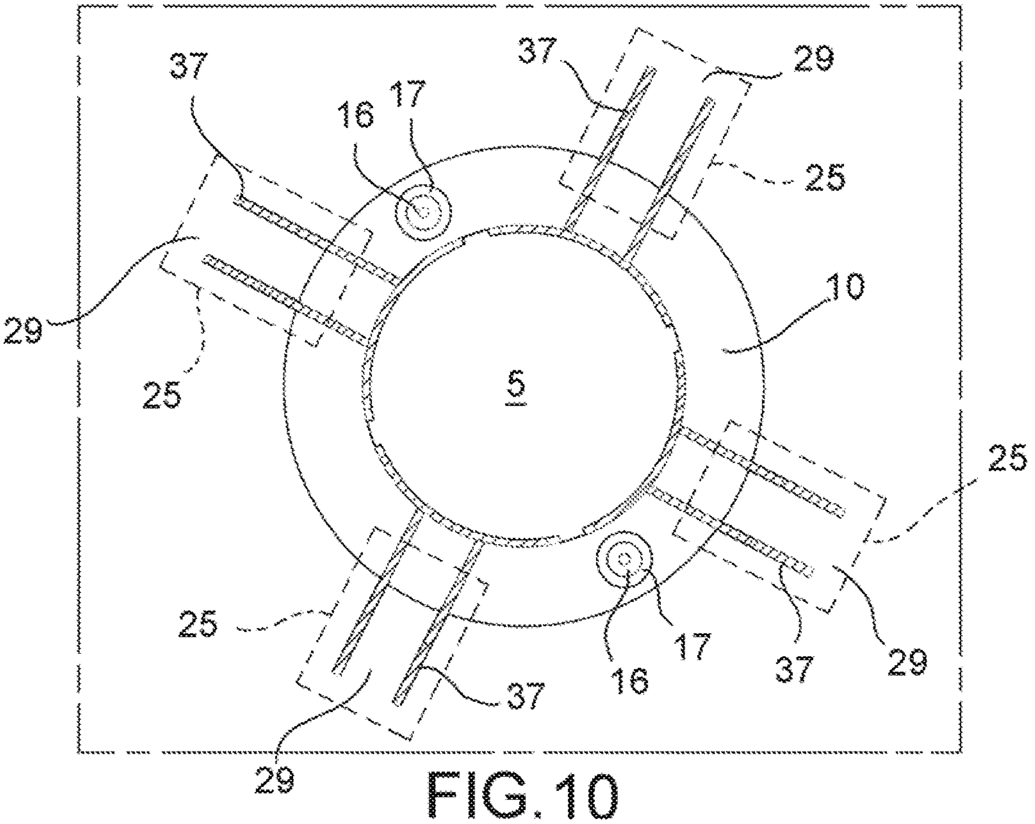
FIG. 10 is a cross section of an upper lifting device, according to an embodiment, when rest onto the main deck wherein the section is undertaken along the cutting plane indicated with A-A in FIG. 8 and the tension rods are not shown for sought of clarity.

According to a general embodiment, it is provided an assembly 1 for lifting a payload 2 of an offshore platform 3.

Preferably, said payload 2 is a topside module of an offshore platform 3. Preferably, said offshore platform 3 further comprises at least one support structure 4 supporting the payload 2. Preferably, said payload 2 comprises at least one main deck 50 and at least one column 6 directly connected to said support structure 4. Preferably, said at least one column 6 supporting said at least one main deck 50 at a predetermined deck height h50 from the sea level 48.

Preferably, said at least one column 6 is directly connected to a support structure column 30 of said support structure 4, wherein said column 6 of the payload 2 and said a support structure column 30 of said support structure 4 are in single piece and/or integral to each other. Preferably, said payload 2 comprises a plurality of decks 5, 32, 33 located above said main deck 50. Preferably, said payload 2 comprises a plurality of columns 6 supporting at least said main deck 50.

For example, said support structure 4 comprises at least one offshore floating support structure designed to support said payload 2, such as a caisson. For example, said support structure 4 comprises at least one offshore support structure anchored to the seabed, such as a jacket and/or a plinth, and designed to support said payload 2.

Figure 11:
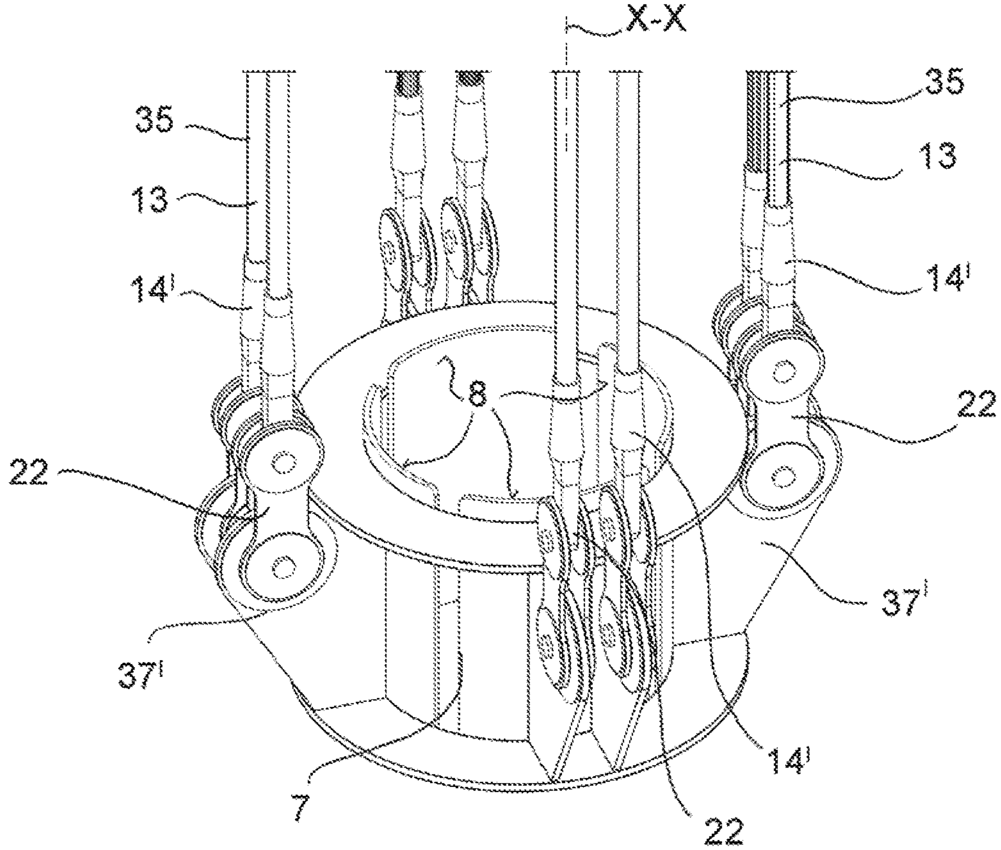
FIGS. 11 and 12 are respectively a perspective view and an elevation view of a lower lifting device, according to an embodiment.
Figure 12:
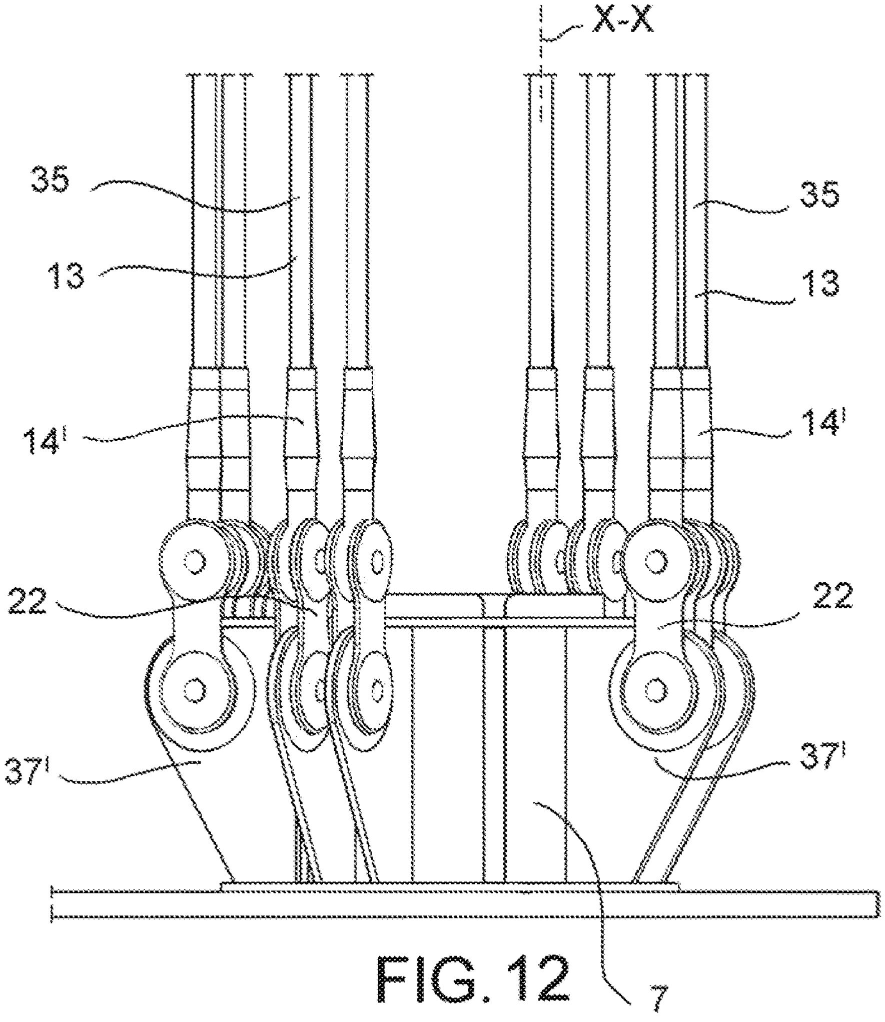
Figure 13:
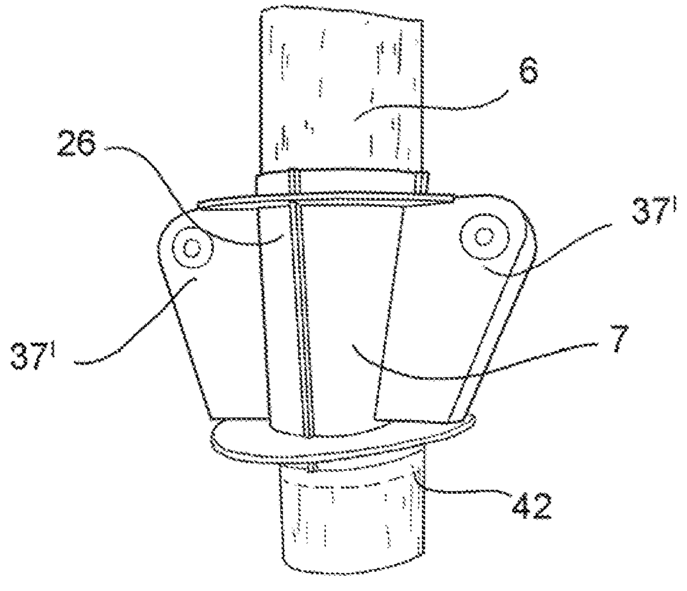
FIG. 13 is a perspective view of a lower lifting device, according to an embodiment, welded to a column of the payload.

Said assembly 1 comprises at least one lower lifting device 7, having at least one welding surface 8 weldable to a welding portion 9 of said at least one column 6 of said payload 2. According to a preferred embodiment, said lower lifting device 7 comprises a plurality rolled shells 24, 26 suitable for embracing said column 6 and for facing said at least one welding surface 8 towards said welding portion 9 of the column 6, as shown for example in FIG. 11. According to an embodiment, said lower lifting device 7 comprises a pair of half shells.

Said assembly 1 comprises at least one upper lifting device 10, having a coupling interface 11 adapted to couple to a coupling portion 12 of said payload 2. Preferably, said coupling portion 12 is located on the upper deck 5 of said payload 2. According to an embodiment, said coupling portion 12 is located on one of the decks 5, 32, 33, 50 of said payload 2. According to an embodiment, said coupling interface 11 of the upper lifting device 10 rests onto said coupling portion 12, and said coupling portion 12 is a portion of a walkable surface of a deck 5, 32, 33, 50 of said payload 2.

According to an embodiment, said at least one upper lifting device 10 comprises a positioning device 17 designed to engage with a respective positioning portion 16 of said payload 2, for example of said upper deck 5 and/or of said main deck 50. According to a preferred embodiment, said coupling portion 12 comprises said at least one positioning portion 16, for example at least one coupling pin protruding upwardly from one of the decks 5, 32, 33, 50 of the payload 2, and preferably from the upper deck 5, and said coupling interface 11 of said at least one upper lifting device 10 comprises said at least one positioning device 17, for example at least one coupling seat suitable for engaging said at least one coupling pin with or without clearance. According to an embodiment, said coupling interface 11 of the assembly 1 is made of a pot, having a body cylindrical in shape which defines a cavity.

According to an embodiment, the at least one upper lifting device 10 is designed to rest on one of the decks 5, 32, 33, 50 in such way that the at least one coupling pin engages said coupling seat.

Said assembly 1 comprises a plurality of tension rods 13, connecting said lower lifting device 7 and said at least one upper lifting device 10. Preferably, said tension rods 13 are made of steel, preferably high tensile steel.

The term "rods" used herein is intended to mean also "bars" and the like.

Preferably, said welding portion 9 of said at least one column 6 is located at a predetermined welding portion height h9 from the sea level 48, said welding portion height h9 being less than said deck height h50. In other words, when in operative conditions, said at least one upper lifting device 10 is located at a higher level than said lower lifting device 7 of said assembly 1. In further other words, said welding portion 9 of said column 6 being located at a lower level in respect of said main deck 50 of said payload 2 and said coupling portion 12 of said payload 2 being located at a higher level in respect of said welding portion 9 so that, when said assembly 1 is in operative condition, said at least one upper lifting device 10 is located at a higher level in respect of said lower lifting device 7.

According to a preferred embodiment, at least some tension rods 13 and preferably each tension rod 13 of said plurality of tension rods extends for a rod length along a rod direction X-X between said lower lifting device 7 and said at least one upper lifting device 10. Preferably, said tension rods 13 extend parallel one another and parallel to a single rod direction X-X. Preferably, said rod direction X-X is substantially a vertical direction. Preferably, the number of tension rods of said plurality of tension rods 13 and the cross-section area of each tension rod 13 are chosen to ensure that the Young's modulus defined by the set of said plurality of tension rods 13 connected to the lower lifting device 7 embracing a single columns 6 is comparable with, and preferably substantially equal to, the Young's modulus of such a single column 6. In this way, a lifting forces path alternative to the payload columns 6 is defined for the purpose of avoiding to overstress the columns 6 during lifting, for example avoiding to apply tensile and shear overstress actions which can break the structural integrity of the columns 6.

Advantageously, at least some tension rods 13, and preferably each tension rod 13, of said plurality of tension rods are pre-tensioned, in such way to exert a compressive action to said payload 2.

In this way, it is allowed to pre-load at least some tension rods 13 for the purpose of at least mitigate the stress acting on the columns 6 of the payload 2 during lifting. In particular, it is possible to stress the columns only to compressive stress during lifting, avoiding to force the columns 6 of the payload 2 to load also tensile stresses, which would have, arose during lifting in absence of pre-loading the tension rods 13.

Preferably, pre-tensioning the tension rods 13 is achieved by means of adjusting the rod length. According to a preferred embodiment, said tension rods 13 are pre-tensioned by means of adjusting the rod length of a predetermined amount that provokes a substantially 10% increase of tensile stress of at least some tension rods 13 and preferably of each tension rod 13, wherein said 10% increase is to be read with 15% tolerance.

According to a preferred embodiment, at least some tension rods 13 and preferably each tension rod 13 of said plurality of tension rods are associated to at least one tensioning device, suitable for adjusting the rod length for the purpose of pre-tensioning the tension rod 13, in such way to exert said compressive action to said payload 2.

According to an embodiment, said tensioning device comprise a Macalloy® tensioner.

Thanks to the provision of said at least some pre-tensioned tension rods 13, all tension rods 13 can cooperate together during the lifting of said payload 2 after having separated the column 6 from the support structure 4, thus avoiding slacks in said tension rods 13.

Thanks to the provision of said pre-tensioned tension rods 13, said assembly 1 avoids to exert a traction action on said payload columns 6, and instead loads the payload columns 6 with a compressive action. By means of applying said compressive action on said payload columns 6, the compressive stress acting on said columns 6 during lifting is substantially equal to or less than the compressive stress acting on said columns 6 during normal use of the offshore platform 3. In this way, the structural integrity of the columns 6 can be safeguarded and therefore the reliability of the lifting action is enhanced, even if the columns 6 are structurally worn at least in some part thereof.

Such an assembly 1 allows to lift the payload 2 having anchoring points located underneath the payload itself, by means of hanging said assembly 1, and particularly said at least one upper lifting device 10, to a crane, preferably a crane vessel 31.

Lifting the payload 2 from underneath avoids tensile stresses and unwanted tensile strains of the payload 2 during lifting and transportation of the payload 2. Such a tensile strains of the payload, particularly of the columns 6 of the payload 2, are undesirable as the tensile strain resistance of the payload columns 6 is typically a priori unknown whereas the payload 2 itself, for example a topside module of an offshore platform 3, has been installed onto said support structure 4 many years before the time of performing lifting operations.

According to a preferred embodiment, said assembly 1 comprises at least one spreader bar 15 connected to said at least one upper lifting device 10 and designed to be lifted by at least one crane for the purpose of lifting the payload 2, after having separated said at least one column 6 from said support structure 4. The provision of said spreader bar 15 allows to balance the stress amount arising from the lifting action and to split it onto the tension rods 13, and thus the amount compressive load onto the columns 6, during lifting. Moreover, the provision of said spreader bar 15 makes the assembly 1 more compact in height in operative conditions.

The terminology "spreader bar" 15 indicates also a "spreader frame" and the like.

According to an embodiment, said assembly 1 comprises at least one rigging device 27 connectable to said at least one upper lifting device 10 and comprising at least one of said spreader bar 15. Preferably, said rigging device 27 also comprises tension cables 44, such as slings or grommets or the like, for connecting said at least one spreader bar 15 to a crane hook 28 associable to said rigging device 27.

According to an embodiment, said rigging device 27 comprises at least one internal lifting tool 38 or ILT 38 designed for engaging at least one engaging interface 39 of said at least one upper lifting device 10. Preferably, said engaging interface 39 comprises engaging means such as a clamp or the like, suitable for firmly engaging with said internal lifting tool 38, for example for form-fitting with said internal lifting tool.

According to an embodiment, said spreader bar 15 is associated, for example by means of tension cables 44' such as a slings or a grommets or the like, to said at least one internal lifting tool 38 comprising at least one engaging portion, and said at least one upper lifting device 10 comprises at least one engaging interface 39, wherein said at least one engaging portion of the internal lifting tool 38 form fits with said at least one engaging interface 39 of the at least one upper lifting device 10 of the assembly 1. In this way, a quick releasable engagement of the internal lifting tool 38 and the engaging interface 39 of the at least one upper lifting device 10 is achievable.

Preferably, said engaging interface 39 of said at least one upper lifting device 10 is cup-shaped defining an engaging seat surface, and said engaging portion of said internal lifting tool 38 comprises hydraulically-actuated projections which engages with said engaging seat surface. Preferably, said hydraulically-actuated projections of said engaging portion are favorably wedge-shaped for the purpose of lifting. According to an embodiment, said engaging portion of said internal lifting tool 38 is associated to at least one hoisting arm 40.

According to a preferred embodiment, said assembly 1 comprises a plurality of upper lifting devices 10 connected to a plurality of respective lower lifting devices 7 by means of a plurality of tension rods 13, wherein said rigging device 27 connects said plurality of upper lifting devices 10 and is designed to be hung to a crane hook 28 associable to said assembly 1.

According to an embodiment, said rigging device 27 comprise a single spreader bar 15 connected to a plurality of upper lifting devices 10 by means of a plurality of internal lifting tools 38.

According to an embodiment, said rigging device 27 is releasably yet firmly connected to said at least one upper lifting device 10, preferably by means of said internal lifting tool 38.

According to an embodiment, said assembly 1 comprises at least one mapping system 18, suitable for detecting information about the structural status of said payload 2 for the purpose of adjusting the rod length of at least some tension rods 13, and preferably of each tension rod 13. In this way, it is possible to adjust the rod length in response to the information acquired by said mapping system 18 in order to achieve a uniform distribution of the lifting force among the tension rods 13 of said assembly 1.

According to an embodiment, said at least one mapping system 18 comprises a plurality of load cells 19, suitable for acquiring information about the stressing status of said plurality tension rods 13 and for transmitting a load cell signal containing said information about the stressing status, preferably at least one load cell 19 of said plurality of load cells being located on each tension rod 13.

According to an embodiment, said at least one mapping system 18 comprises at least one inclination sensor 20, suitable for acquiring information about the spatial orientation of said main deck 50 and transmitting an inclination signal containing said information about the spatial orientation of said main deck 50, preferably said at least one inclination sensor 20 being attached to said at least one main deck 50 in such way to detect the spatial orientation of said main deck 50. According to an embodiment, said at least one inclination sensor 20 detects the tilting movement of the main deck during lifting.

According to an embodiment, said at least one mapping system 18 comprises at least one data acquisition module 21, suitable for receiving said load cell signal and/or said inclination signal and for transmitting an output signal to a control unit for controlling said at least one tensioning device for the purpose of adjusting the rod length of at least one tension rod 13, and preferably of each tension rod 13. Preferably, the transmission said output signal to a control unit is a wireless signal transmission.

According to an embodiment, said at least one mapping system 18 comprises wired connections 23 connecting said data acquisition module 21 to said load cells 19 and/or to said at least one inclination sensor.

According to an embodiment, at least some tension rods 13 and preferably each tension rod 13 is connected to at least one between said lower lifting device 7 and said upper lifting device 10 by means of at least one rod end bearing 22, for example a rose bearing device 22 such as a Macalloy® bar joint.

According to an embodiment, said rod end bearing 22 comprises a ball joint connecting a tension rod 13 to at least one between said lower lifting device 7 and said at least one upper lifting device 10. Preferably, said rose bearing device 22 forms a joint providing at least one degree of freedom of rotational motion about an axis transversal to said rod direction X-X, to avoid transmission of flexing actions from either the at least one upper lifting device 10 or the at least one lower lifting device 7 to the tension rods 13. Preferably, said rose bearing device 22 forms a joint providing a tension rod 13 connected thereto with at least one degree of freedom of tilting motion in respect of at least one of said at least one upper lifting device 10 and said at least one lower lifting device 7.

According to an embodiment, both said at least one upper lifting device 10 and said lower lifting device 7 comprises lift point padeyes 37, 37' comprising connecting sites for respective rose bearing devices 22.

Preferably, the lift point padeyes 37 of the at least one upper lifting device 10 are vertically aligned with the lift point padeyes 37' of the respective at least one lower lifting device 7. The provision of such a vertical alignment between lift point padeyes 37, 37' of the at least one lower lifting device 7 and of the at least one upper lifting device 10 respectively, allows to reduce at the minimum twisting stress to the tension rods 13.

According to an embodiment, at least one of said tension rods 13, and preferably each tension rod 13, comprises at least one Macalloy® bar, which is a pre-tensionable axial structure suitable to work only in traction. According to an embodiment, said at least one tensioning device comprises at least one Macalloy® tensioners, such as a Macalloy® "techno tensioner".

According to an embodiment, at least some tension rods 13 and preferably each tension rod 13 comprise an upper tension rod portion 34 connected to said at least one upper lifting device 10 and a lower tension rod portion 35 connected to said lower lifting device 7, wherein said upper tension rod portion 34 and said lower tension rod portion 35 are made in separated pieces. According to a preferred embodiment, at least some tension rods 13 and preferably each tension rod 13 further comprises at least one joining device 14, 14', such as a turnbuckle or the like. Preferably, said joining device 14, 14' connects said upper tension rod portion and said lower tension rod portion.

According to an embodiment, said joining device 14 comprises a joining device sleeve 36 embracing at time respective ends of said upper tension rod portion 34 and of said lower tension rod portion 35. For example, said joining device sleeve 36 defines said at least one threated female seat 46. According to an embodiment, said joining device 14' connects a end of said rod 13 either to said at least one upper lifting device 10 or said lower lifting device 7 of said assembly 1.

According to an embodiment, said at least one joining device 14 is located within each tension rod 13 at a predetermined distance from the at least one upper lifting device 10, and preferably, said predetermined distance of location of said at least one joining device is substantially half the rod length.

According to an embodiment, at least one of said tension rods 13 and/or of said upper tension rod portion 34 and/or said lower tension rod portion 35 comprises at least one rod end with threaded male portions 45, 45' at his tow extremities. According to an embodiment, at least one of said tension rods 13 comprises at least one threated female seat 46 to engage with at least one of said threaded male portions of the tension rod 13.

According to a general embodiment, a crane vessel system comprising at least one crane vessel 31 comprising at least one crane 43 hanging at least one assembly 1 for lifting a payload 2 according to any one of the preceding claims. Preferably, said crane 43 comprises at least one crane hooking device 28 designed for supporting hung thereto at least one rigging device 27. For example, said rigging device 27 comprises a sling forming an eyelet 47 for the purpose of being hung to said crane hooking device 28.

According to an embodiment, said at least one tension cable 44 hung the spreader bar 15 to said crane hooking device 28, and a further set of tension cables 44' connect said spreader bar 15 through said internal lifting tool 38 engaged with said engaging interface 39, to said at least one upper lifting device 10.

According to a preferred embodiment, said crane vessel system further comprising at least one payload 2 of an offshore platform 3 connected to said assembly 1. Preferably, said payload 2 connected to said assembly 1 and to said crane vessel 31 is subject to compressive action exerted by said assembly 1.

A method for lifting a payload 2 of an offshore platform 3 will be described in the following.

According to a general embodiment, it is provided a method for lifting a payload 2 of an offshore platform 3, wherein said offshore platform 3 comprises at least one support structure 4 supporting the payload 2, said payload 2 comprising at least one main deck 50 and at least one column 6 directly connected to said support structure 4, said at least one column 6 supporting said at least one main deck 50. For example, the connection between said payload 2, such as a topside or the like, to said support structure 4, such as a jacket or the like, may be a junction of any type known in the field, for example may comprise a male-female engagement and/or a wedge engagement.

The method comprises the step of welding at least one lower lifting device 7 to a welding portion 9 of said at least one column 6 of the payload 2. Preferably, said welding portion 9 is located at a lower level in respect of said main deck 50. According to a preferred embodiment, said welding portion 9 is located near the junction between the platform offshore topside and the offshore platform jacket.

According to a preferred operating mode, the method comprises the step of connecting to said lower lifting device 7 a plurality of tension rods 13. Preferably, said plurality of tension rods 13 are arranged to encircle said at least one column 6 of said payload 2. According to an embodiment, said plurality of tension rods 13 are gathered in pairs, said pairs of tension rods 13 being preferably equally spaced from one another around said at least one column 6.

The method further comprises the step of coupling at least one at least one upper lifting device 10 to a coupling portion 12 of at least one of the decks 5, 32, 33, 50 of said payload 2. Preferably, said coupling portion 12 is located on the top or roof of the upper deck 5 of said payload 2.

According to a preferred embodiment, said at least one upper lifting device 10 couples to said coupling portion 12 by means of resting onto a surface, preferably a walkable surface, of said at least one deck 5, 32, 33, 50 which comprises said coupling portion 12. In other words, said coupling portion 12 comprises a portion of a surface of a deck 5, 32, 33, 50 and said coupling interface 11 of the at least one upper lifting device 10 couples to said coupling portion 12 by resting on it, and preferably also by positioning the at least one upper lifting device 10 in a predefined arrangement by means of engaging said positioning portion 16 of the coupling portion 12 of the deck with said positioning device 17 of the coupling interface 11 of the at least one upper lifting device 10.

According to a preferred operating mode, the method further comprises the step of connecting said plurality of tension rods 13 to said at least one at least one upper lifting device 10. The method further comprises the step of pre-tensioning the tension rods 13 by means of adjusting the rod length of at least some tension rods 13, and preferably of each tension rod 13, in such way to apply a compressive action to said payload 2.

Preferably, said compressive action is applied to the columns 6 of the payload 2, avoiding the rise of tensile stress on said columns 6 during lifting. Preferably, said pre-tension, or pre-load, action determines substantially 10% increase in tensile stress on the tension rods 13, wherein said 10% increase is to be read with 15% tolerance. According to an embodiment, said pre-tension action is detected by said load cells 19.

According to an embodiment, said step of connecting to said lower lifting device 7 a plurality of tension rods 13 and said step of connecting to said at least one upper lifting device 10 said plurality of tension rods 13 are performed substantially at the same time.

According to an operating mode, the steps of connecting and of pre-tensioning are carried out substantially at the same time.

According to an operating mode, the method steps described above allow to get a pre-rigging arrangement mounted on the payload 2 for the purpose of engage with the pre-rigging device 27. In other words, the method steps described above lead to the realization of a pre-rigging arrangement comprising said at least one upper lifting device 10 coupled to said coupling portion of the payload, said at least one lower lifting device welded to said welding portion of said at least one column 6 and said tension rods 13 pre-tensioned. Thanks to this method, it is possible to configure the payload in said pre-rigging arrangement prior to approaching the offshore platform with the crane vessel. In this method, the length of time operation of the crane vessel usage is therefore shortened with respect to known solution.

According to a preferred operating mode, the method comprises the further step of engaging said at least one upper lifting device 10 with said rigging device 27. In other words, the step of engaging involves the engagement of said pre-rigging arrangement with said rigging device 27. Preferably, said step is performed by means of engaging said internal lifting tool 38 of the rigging device 27 with the engaging interface 39 of the at least one upper lifting device 10.

According to a preferred operating mode, the method comprises the further step of facing upwards at least some of, and preferably all, the engaging interfaces 39 of the at least one upper lifting device 10 for the purpose of engage with the internal lifting tools 38 of the rigging device 27. In this way, it is possible to make quicker the step of engaging.

According to a preferred operating mode, the step of engaging comprises the further step of lowering down a plurality of tension cables 44', such as slings or the like, wherein said tension cables 44' having each an internal lifting tool 38 connected at its lower end, and said spreader bar 15 connected at its upper end. Preferably, this step of lowering down is performed by lowering down said at least one internal lifting tool 38 towards said at least one engaging interface 39 of the at least one upper lifting device 10 of the assembly 1, preferably while the tension rods 13 are in pre-tensioned condition.

Thanks to the provision of said at least one upper lifting device 10 comprising said engaging interface 39, for example a clamp or the like, designed to engage with said internal lifting tool 38 of the rigging device 27, is possible to achieve a quick engagement of the pre-rigging device to the rigging device 27 for the purpose of lifting the payload 2.

According to an operating mode, said step of engaging is performed after the step of connecting a plurality of tension rods 13.

The method further comprises the step of separating at least a portion of said at least one column 6 from said support structure 4 of the offshore platform 3, for the purpose of lifting said payload 2. In other words, interrupting the structural continuity between said payload 2 and said support structure 4. Preferably, this step is performed by cutting said at least one column 6 beneath said main deck 50 and preferably beneath said welding portion 9, preferably by cutting said column 6 along a cutting profile 42. According to a preferred embodiment, this step of separating is performed by means of cutting said at least one column 6 beneath said welding portion 9. According to an embodiment, said cutting profile 42 is located near the junction between the payload and the support structure. Preferably, said step of separating involves a plurality of columns 6 at the same time.

According to a mode of operation, said step of separating is performed while the tension rods 13 are pre-tensioned. According to an embodiment, said step of separating is performed by means of cutting said at least one column 6 and preferably a plurality of columns 6 while the tension rods 13 connecting the at least one upper lifting device and the at least one lower lifting device are in a pre-tensioned condition, in other words are exerting the compressive action on said payload 2.

According to an operating mode, said step of engaging is performed before the step of separating.

The method provided for enables to lift the payload 2 having anchoring points located underneath the payload itself, by means of hanging said assembly 1, and particularly said at least one upper lifting device 10, to a crane, preferably a crane vessel 31 such as a tandem crane vessel.

According to a mode of operation, the step of pre-tensioning is performed by means of a pre-tensioning device associable to said assembly 1.

According to a mode of operation, the step of pre-tensioning can be performed at any time in the sequence of the method steps.

According to a mode of operation, the method comprises, after the step of separating, the further step of lifting said payload 2 by means of a crane vessel 31 connected to said rigging device 27, such as a tandem crane vessel. Preferably, this step of lifting is performed after having connected, preferably after having hung, said rigging device 27 to said crane vessel 31.

According to an mode of operation, the method comprises before the step of welding the further steps of:

- defining, for example drilling, a plurality of through openings 25 on said at least one upper deck 5, and preferably on said at least one coupling portion 12 of said main deck 50;
- defining, for example drilling, a plurality of vertical channels 29 extending from said plurality of through openings 25 to said welding portion of said at least one column 6 through at least said main deck 50 of the payload 2.

Preferably, said vertical channels 29 are made by means of undertaking penetrations in a plurality of decks 5, 32, 33, 50 wherein each of said penetrations is a through hole in a respective deck, and wherein all the through holes are vertically aligned to each other so that the projection of a through hole made on a deck 32 is aligned with a through hole made on a further deck 33 and is aligned with the trough opening made across said main deck 50 and across said upper deck 5. According to a preferred embodiment, for each column 6 of the payload 2 at least four vertical channels 29 surrounding said column 6 are drilled, and wherein each of said four channels 29 receives at least one tension cable 13 and preferably at least a pair of tension cables 13.

According to a mode of operation, the method comprises the following further steps:

- inserting said plurality of tension rods 13 in said through openings 25;
- then lowering said tension rods 13 down through said vertical channels 29;
- then connecting said tension rods 13 to said lower lifting device 7.

According to a mode of operation, the steps of inserting said plurality of tension rods 13 in said through openings 25 and then lowering said tension rods 13 down through said vertical channels 29 are carried out in the following steps:

- first, inserting said plurality of lower tension rod portions 35 in said through openings 25;
- then lowering said lower tension rod portions 35 down through said vertical channels 29;
- then connecting, through said joining devices 14, said upper tension rod portions 34 to respective lower tension rod portions 35.

According to a mode of operation, the method comprises in between the steps of connecting said tension rods to said lower lifting device 7 and of connecting said tension rods to said at least one upper lifting device 10, the further step of tying-off said tension rods 13. In this way, the step of coupling the at least one upper lifting device to said coupling portion of the payload is simplified.

According to a mode of operation, the method comprises the step of installing said mapping system 18 to said assembly 1. Preferably, this step of installing said mapping system 18 comprises the steps of:

- installing load cells 19 to said tension rods 13;
- connecting by means of wired connections 23 said load cells 19 to said data acquisition module 21. Preferably, said data acquisition module 21 is located on said crane vessel 31.

According to a mode of operation, the method comprises before the step of welding the further step of mapping the structural status of the payload 2. Preferably, this step of mapping the structural status of the payload 2 aims to prepare the definition of said a plurality of vertical channels 29 to make sure that drilling said vertical channels 29 avoid to cut structural beams of the payload 2, for example transversal beams 41 supporting said main deck 50 or said decks 5, 32, 33. Preferably, this step of mapping the structural status of the payload 2 allow the removal of equipment before drilling said vertical channels 29. According to a mode of operation, the step of mapping the structural status of the payload 2 comprises the step of survey the status around columns 6.

According to a preferred mode of operation, the step of mapping the structural status of the payload 2 comprises the step of conducting non-disruptive evaluation of the structural status of the payload 2 to establish suitability to determine through openings and/or to drill. For example, said non-disruptive evaluation is performed with ultrasonic mapping.

According to a preferred mode of operation, the method comprises before the step of welding the further step of establishing an access for the workers to the welding portion 9 of the column 6.

According to a mode of operation, the method comprises before the step of welding the further step of cleaning an area around the lower lifting device 7. According to a mode of operation, the method comprises before the step of welding the further step of removing paint from the welding portion 9 of said column 6 to improve welding adhesion.

According to a mode of operation, the step of coupling is performed coupling at least one coupling pin protruding upwardly from said main deck 50 with respective at least one coupling seat with or without clearance, for the purpose of aligning said lift point padeyes 37, 37' and said rose bearing devices 22 of both said upper lifting device 10 and said lower lifting device 7 with said vertical channels 29.

Thanks to the features described above, either provided for separately or in combination, whereas applicable, it is possible to meet the aforementioned needs obtaining the aforementioned advantages, and in particular:

- it is disclosed an efficient alternative to existing methods of heavy topside module removal;
- avoiding to overstress the topside columns during lifting, the risks related to the structural status of such old columns are reduced to the minimum;
- risks of lifting failure due to unpredictable tension factors are reduced to the minimum;
- it is provided a new lifting path that is alternative to the existing columns of the payload;
- in particular, thanks to the tension rods, as described, it is provided a new lifting path which is arranged in parallel to the existing columns of the topside;
- at the same time, the existing columns are capitalized acting as a stability guides for the lifting method disclosed herein and are loaded only with compressive loads during lifting;
- further, it is possible to perform payload removal and transport avoiding the need of making the payload to rest on a floating structure, such as a deck of a barge or the like, and therefore the proposed method and assembly result of simplified realization and, in particular, thanks to the proposed solutions the high tolerances that would be needed for safely transferring the payload to a transport barge are not required;
- at the same time, the provision of said rigging arrangement guarantees a satisfactory balance of lifting forces;
- therefore, it is reduced the length of time required to complete the lifting action;
- it is possible to obtain a higher efficiency in terms of weight of the assembly 1/weight of the payload ratio, and in particular the weight of the assembly over the weight of the payload ratio is reduced in respect of known solutions;

the step of lifting can be made faster in respect of known solutions;

the step of separating the payload can be achieved during the compressive pre-tensioning action onto said payload and particularly onto said columns;

the method and the assembly according to the invention are particularly suitable for offshore construction vessels, such as semi-submersible crane vessels.

Those skilled in art may make many changes and adaptations to the embodiments described above or may replace elements with others which are functionally equivalent in order to satisfy contingent needs without however departing from the scope of the appended claims.

REFERENCE LIST

1 Assembly
2 Payload
3 Offshore platform
4 Support structure of the offshore platform
5 Upper deck
6 Column of the payload
7 Lower lifting device
8 Welding surface of the lower lifting device
9 Welding portion of the column
10 Upper lifting device
11 Coupling interface of the upper lifting device
12 Coupling portion of the main deck
13 Tension rod
14, 14' Joining device
15 Spreader bar
16 Positioning portion of the coupling portion
17 Positioning device of the coupling interface
18 Mapping system
19 Load cell
20 Inclination sensor
21 Data acquisition module
22 Rod end bearings
23 Wired connection
24, 26 Rolled shells of the lower lifting device
25 Through openings
27 Rigging device
28 Crane hook
29 Vertical channels
30 Column of the support structure of the offshore platform
31 Crane vessel
32, 33 Decks of the offshore platform
34 Upper tension rod portion
35 Lower tension rod portion
36 Sleeve of the joining device
37, 37' Lift point padeyes
38 Internal lifting tool
39 Engaging interface of the upper lifting device
40 Hoisting arm
41 Transversal beam of the offshore platform
42 Cutting profile
43 Crane
44, 44' Tension cable
45, 45' Threaded male portion
46 Threaded female seat
47 Eyelet
48 Sea level
50 Main deck
h50 Deck height from the sea level
h9 Coupling portion height from the sea level
X-X Rod direction

What is claimed is:

1. A method for lifting a payload of an offshore platform, said offshore platform comprising at least one support structure supporting the payload, said payload comprising at least one main deck and at least one column directly connected to said at least one support structure, said at least one column supporting said at least one main deck, the method comprising:

welding at least one lower lifting device to a welding portion of said at least one column of the payload, said welding portion being located at a lower level in respect of said at least one main deck;

connecting a plurality of tension rods to the lower lifting device below said at least one main deck;

coupling at least one upper lifting device to the plurality of tension rods above said at least one main deck;

pre-tensioning said plurality of tension rods by adjusting rod length of at least some tension rods to apply a compressive action to said payload; and separating at least one portion of said at least one column from said at least one support structure of the offshore platform for lifting said payload; and lifting said payload using a crane vessel attached to said at least one lower lifting device and said at least one upper lifting device, wherein said lower at least one lower lifting device and said upper lifting device apply a compressive stress to said at least one column of said payload during the lifting.

2. The method of claim 1, further comprising engaging said at least one upper lifting device with a rigging device, by engaging an internal lifting tool of the rigging device with an engaging interface of the at least one upper lifting device; and/or wherein the engaging step is performed after the step of connecting the plurality of tension rods; and/or wherein the engaging step is performed before the separating step; and/or wherein facing upwards at least some engaging interfaces of the at least one upper lifting device for engagement with the internal lifting tool of the rigging device.

3. The method of claim 1, wherein the coupling step further comprises:

resting said at least one upper lifting device onto a surface, including a walkable surface, of at least one deck comprising said coupling portion;

positioning the at least one upper lifting device in a predefined arrangement by engaging said positioning portion with said positioning device.

4. The method of claim 1, wherein:

the separating step is performed while tension rods of said plurality of tension rods are in pre-tensioned condition; and/or wherein the separating step is performed by cutting said at least one column beneath said welding portion; and/or wherein the separating step is performed by cutting said at least one column while the tension rods connecting the at least one upper lifting device and the lower lifting device are pre-tensioned; and/or wherein the pre-tensioning step is performed by a pre-tensioning device.

5. The method of claim 1, wherein the lifting step is performed after having connected said payload to a crane vessel.

6. The method of claim 1, further comprising inserting at least one end of a tension rod of said plurality of tension rods into a vertical channel above said at least one main deck; and lowering said plurality of tension rods below said at least one main deck through said vertical channel to position said plurality of tension rods near said welding portion.

7. The method of claim 1, further comprising connecting said plurality of tension rods to said at least one upper lifting device using a coupling portion.

8. The method of claim 1, further comprising attaching at least some tension rods of said plurality of tension rods with at least one joining device, wherein an upper tension rod portion and a lower tension rod portion are made in separated pieces, and wherein said at least one joining device connects said upper tension rod portion and said lower tension rod portion to form said at least some tension rods of said plurality of tension rods.

9. The method of claim 8, wherein connecting said at least some tension rods of said plurality of tension rods with at least one joining device utilize a turnbuckle as said at least one joining device.

10. The method of claim 8, further comprising:

connecting said upper tension rod portion to said at least one upper lifting device; and connecting said lower tension rod portion to said at least one lower lifting device.

* * * * *